United States Patent
Krishnaswamy et al.

(10) Patent No.: US 9,733,956 B2
(45) Date of Patent: Aug. 15, 2017

(54) ADJUSTING SETTINGS BASED ON SENSOR DATA

(71) Applicant: INTEL CORPORATION, Santa Clara, CA (US)

(72) Inventors: Prasanna Krishnaswamy, Bangalore (IN); Gangatharan Jothiswaran, Bangalore (IN); Arvind S, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 14/140,358

(22) Filed: Dec. 24, 2013

(65) Prior Publication Data

US 2015/0178101 A1    Jun. 25, 2015

(51) Int. Cl.
*G06F 9/445* (2006.01)

(52) U.S. Cl.
CPC ................ *G06F 9/44505* (2013.01)

(58) Field of Classification Search
None
See application file for complete search history.

(56) References Cited

U.S. PATENT DOCUMENTS

| | | | | |
|---|---|---|---|---|
| 6,501,739 | B1* | 12/2002 | Cohen | H04L 29/06 370/260 |
| 8,912,877 | B2* | 12/2014 | Ling | G06F 1/3203 340/3.1 |
| 2004/0225904 | A1* | 11/2004 | Perez | H04W 52/027 713/320 |
| 2012/0069242 | A1* | 3/2012 | Pearlstein | G10K 11/1788 348/484 |
| 2012/0122483 | A1* | 5/2012 | Aoyagi | G06Q 30/02 455/456.1 |
| 2012/0287035 | A1* | 11/2012 | Valko | G06F 1/3231 345/156 |
| 2013/0083944 | A1* | 4/2013 | Kvist | H04R 1/406 381/92 |
| 2013/0099124 | A1* | 4/2013 | Filson | G05D 23/1902 250/349 |
| 2013/0253877 | A1* | 9/2013 | Ng | F24F 11/0012 702/131 |
| 2013/0279706 | A1* | 10/2013 | Marti | G06F 3/165 381/57 |

\* cited by examiner

*Primary Examiner* — Kim Huynh
*Assistant Examiner* — Paul J Yen
(74) *Attorney, Agent, or Firm* — International IP Law Group, P.L.L.C.

(57) ABSTRACT

Various techniques for adjusting settings based on sensor data are described herein. In one example, a method includes detecting sensor data from a sensor and ranking the sensor data based on predetermined zones. The method can also include identifying a dominant zone from the predetermined zones, and adjusting the setting based on the dominant zone.

16 Claims, 5 Drawing Sheets

300

ADJUSTING SETTINGS BASED ON SENSOR DATA

BACKGROUND

Field

This disclosure relates generally to adjusting settings in a computing device, and more specifically, but not exclusively, to adjusting settings in a computing device based on sensor data.

Description

Many computing devices include an increasing number of hardware components that can collect information related to the operating environment of a computing device. For example, some computing devices include sensors that can collect sensor data that indicates a location or orientation of a computing device. In some examples, the sensor data can be used to modify the execution of applications. For example, the sensor data may be used to modify the execution of an application based on the location of the computing device or the orientation of a computing device.

BRIEF DESCRIPTION OF THE DRAWINGS

The following detailed description may be better understood by referencing the accompanying drawings, which contain specific examples of numerous features of the disclosed subject matter.

DESCRIPTION OF THE EMBODIMENTS

According to embodiments of the subject matter discussed herein, a computing device can adjust settings based on sensor data. In some embodiments, the computing device can detect sensor data from any suitable area or zone proximate a computing device and use the sensor data to determine the location of a user proximate the computing device. In some examples, the computing device can modify various settings, such as the gain, speaker output, and spatial filtering settings, among others, based on the location of a user.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
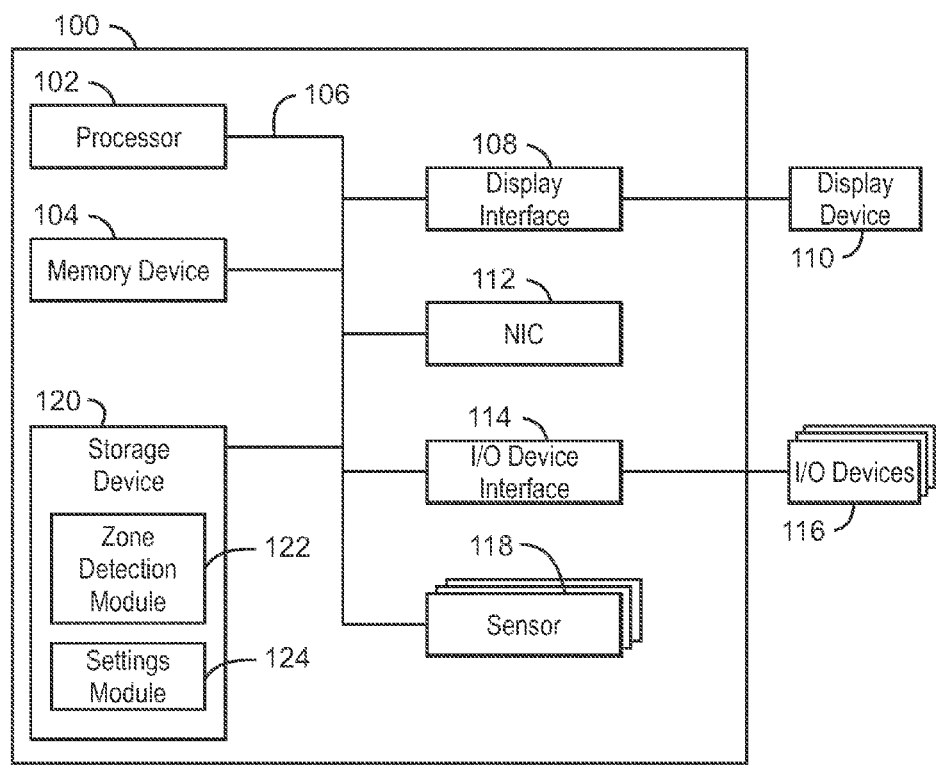
FIG. 1 is a block diagram of an example of a computing system that can adjust settings based on sensor data.

FIG. 1 is a block diagram of an example of a computing device that can adjust settings based on sensor data. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can adjust settings based on sensor data.

The processor 102 may also be linked through the system interconnect 106 (e.g., PCI®, PCI-Express®, HyperTransport®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. In addition, a network interface controller (also referred to herein as a NIC) 112 may be adapted to connect the computing device 100 through the system interconnect 106 to a network (not depicted). The network (not depicted) may be a cellular network, a radio network, a wide area network (WAN), a local area network (LAN), or the Internet, among others.

The processor 102 may be connected through a system interconnect 106 to an input/output (I/O) device interface 114 adapted to connect the computing device 100 to one or more I/O devices 116. The I/O devices 116 may include, for example, a keyboard and a pointing device, wherein the pointing device may include a touchpad or a touchscreen, among others. The I/O devices 116 may be built-in components of the computing device 100, or may be devices that are externally connected to the computing device 100.

The processor 102 may also be linked through the system interconnect 106 to one or more sensors 118. In some embodiments, the sensors 118 can detect any suitable sensor data indicating characteristics of the operating environment of the computing device 100. For example, a sensor 118 may detect sensor data related to the temperature of the area surrounding a computing device 100, a location of the computing device 100, or an orientation of a computing device 100, among others. In some examples, a computing device 100 may include a sensor 118 that detects sensor data for an area proximate the computing device 100. For example, each sensor 118 may detect sensor data corresponding to a separate area or zone proximate the computing device 100. In some examples, a field of view proximate the computing device 100 is divided into separate zones and a sensor 118 detects sensor data from each zone. To increase the accuracy of the sensor data, the computing device 100 may include a larger number of sensors 118 that detect sensor data from smaller zones.

In some embodiments, the processor 102 may also be linked through the system interconnect 106 to a storage device 120 that can include a hard drive, an optical drive, a USB flash drive, an array of drives, or any combinations thereof. In some embodiments, the storage device 120 can include a zone detection module 122 and a settings module 124. In some embodiments, the zone detection module 122 can detect variations in the sensor data and determine a location of a user based on the variations in sensor data. For example, the zone detection module 122 may divide the field of view for a computing device 100 into zones and detect variations in temperature, among other characteristics for each zone. In some embodiments, the zone detection module 122 can detect the location of a user in the field of view of a computing device 100 by detecting a zone in which a temperature variation corresponds to a user. In some examples, a zone that includes a user can be referred to as a dominant zone. The zone detection module 122 can send the sensor data for the dominant zone as well as any other suitable number of zones to the settings module 124. In some examples, the settings module 124 can adjust settings such as special filtering, far field gain, and speaker control, among others. For example, the settings module 124 can apply noise cancellation and modify the gain in a zone that includes a user. The settings module 124 can also detect depth information from the temperature differences in a zone that includes a user. For example, the settings module 124 may detect the depth of a user in the dominant zone based on a difference in temperature and adjust the far field gain to improve the recording quality as well as enhancing the audio quality in a video conferencing session. In some embodiments, the settings module 124 can also adjust the amplitude and other parameters of audio output by adjusting the directionality of a speaker and the amplifier parameters corresponding to the speaker.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the zone detection module 122 and the settings module 124 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the zone detection module 122 and the settings module 124 can be implemented with logic, wherein the logic, as referred to herein, can include any suitable hardware (e.g., a processor, among others), software (e.g., an application, among others), firmware, or any suitable combination of hardware, software, and firmware.

Figure 2:
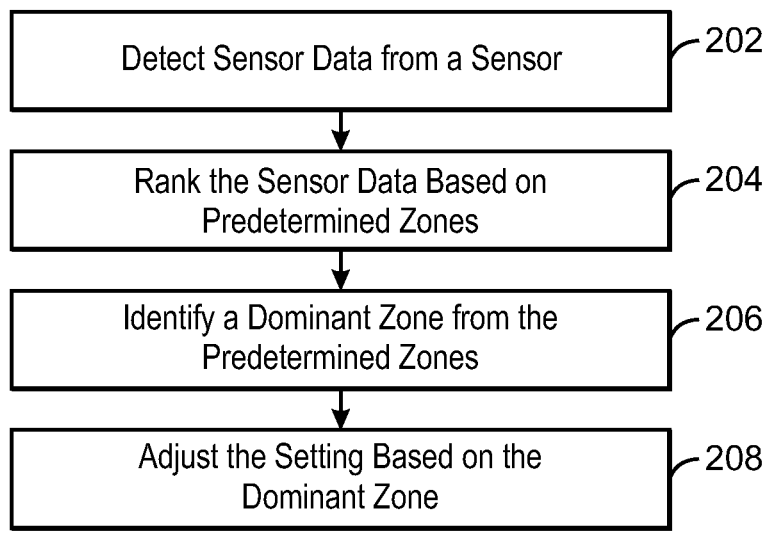
FIG. 2 is a process flow diagram of an example method for adjusting settings based on sensor data.

FIG. 2 is a process flow diagram of an example method for adjusting settings based on sensor data. The method 200 can be implemented with a computing device, such as the computing device 100 of FIG. 1.

At block 202, the zone detection module 122 can detect sensor data from a sensor. As discussed above, a computing device may include any suitable number of sensors that detect sensor data corresponding to zones. For example, a field of view proximate a computing device may be divided into zones in which at least one sensor detects sensor data for each zone. In some examples, the zone detection module 122 can detect sensor data from at least one sensor for each zone.

At block 204, the zone detection module 122 can rank the sensor data based on predetermined zones. In some embodiments, the zone detection module 122 can rank the sensor data, such as temperature profiles, from different zones based on the signal levels and predetermined configurable weights assigned to different zones. The predetermined configurable weights can indicate a preference as to which zone is to be considered a dominant zone when a user occupies multiple zones. For example, the predetermined configurable weights may indicate a preference to assign a center zone or side zone as a dominant zone when a user occupies multiple zones.

At block 206, the zone detection module 122 can identify a dominant zone from the predetermined zones that corresponds to a location of a user. For example, the zone detection module 122 may determine that one zone has a temperature variation that matches a user and identify the zone as the dominant zone. In some embodiments, the zone detection module 122 can also use the predetermined configurable weights to determine a dominant zone. For example, the user may reside in multiple zones and the zone detection module 122 can use the predetermined configurable weights to determine which zone is to be designated as the dominant zone.

At block 208, the settings module 124 can adjust a setting based on the dominant zone. In some examples, the settings module 124 can modify the spatial filtering by applying noise cancellation and modifying the gain in the dominant zone. For example, the settings module 124 can increase the gain in the dominant zone to increase the accuracy of audio recording. In some examples, the settings module 124 can also modify the far field gain by detecting depth information from the temperature differences in the dominant zone. For example, the setting module 124 may detect the depth of a user in the dominant zone based on a difference in temperature and adjust the far field gain to improve the recording quality as well as enhancing the audio quality in a video conferencing session. In some embodiments, the settings module 124 can also adjust the amplitude and other parameters of audio output by adjusting the directionality of a speaker and the amplifier parameters corresponding to the speaker. Additionally, the settings module 124 can also modify display settings based on the depth of a user in the dominant zone. For example, the settings module 124 can adjust a display perspective based on the depth of a user in the dominant zone, modify the text and font size based on the location of a user, and adjust application settings such as the image rendered in a photo viewer application, among others.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 may also include sending the measured sensor data, such as the temperature data corresponding to a zone, to a low pass filter to remove high frequency variations in sensor data due to electrical interference in a module or ambient sensor data.

Figure 3:
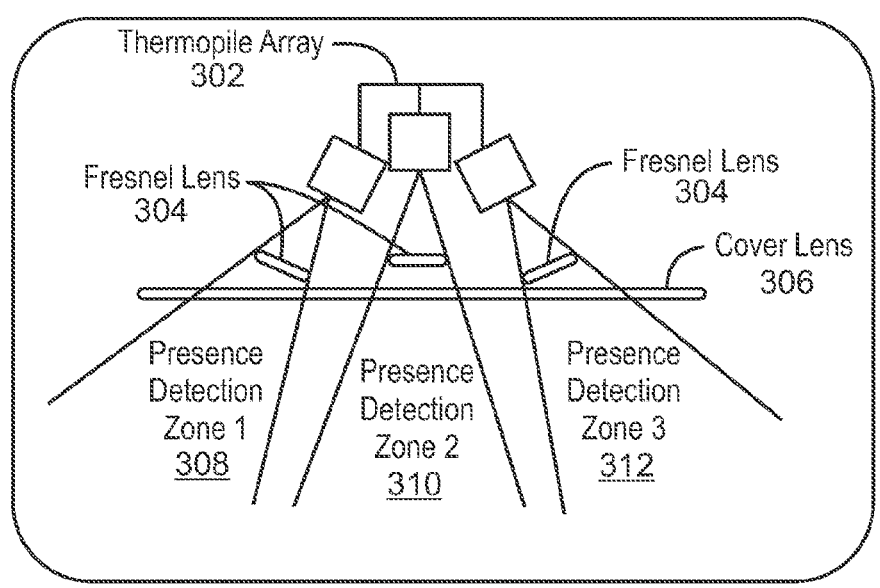
FIG. 3 is an illustration of an example of a system that can detect sensor data.

FIG. 3 is an illustration of an example of a system that can detect sensor data. The system 300 includes a thermopile array 302, a Fresnel lens 304, and a cover lens 306. In some embodiments, the system 300 can detect zones such as the presence detection zone 1 308, the presence detection zone 2 310, and the presence detection zone 3 312. In some examples, there may be any suitable number of zones.

In some embodiments, each thermopile array 302 can detect any suitable temperature or temperature variation corresponding to sensor data from a zone. In some examples, the Fresnel lens 304 can enable a thermopile array 302 to capture sensor data from a particular zone by focusing temperature readings. The lens cover 306 can protect the Fresnel lens 304 from damage such as scratches, and the like.

Figure 4:
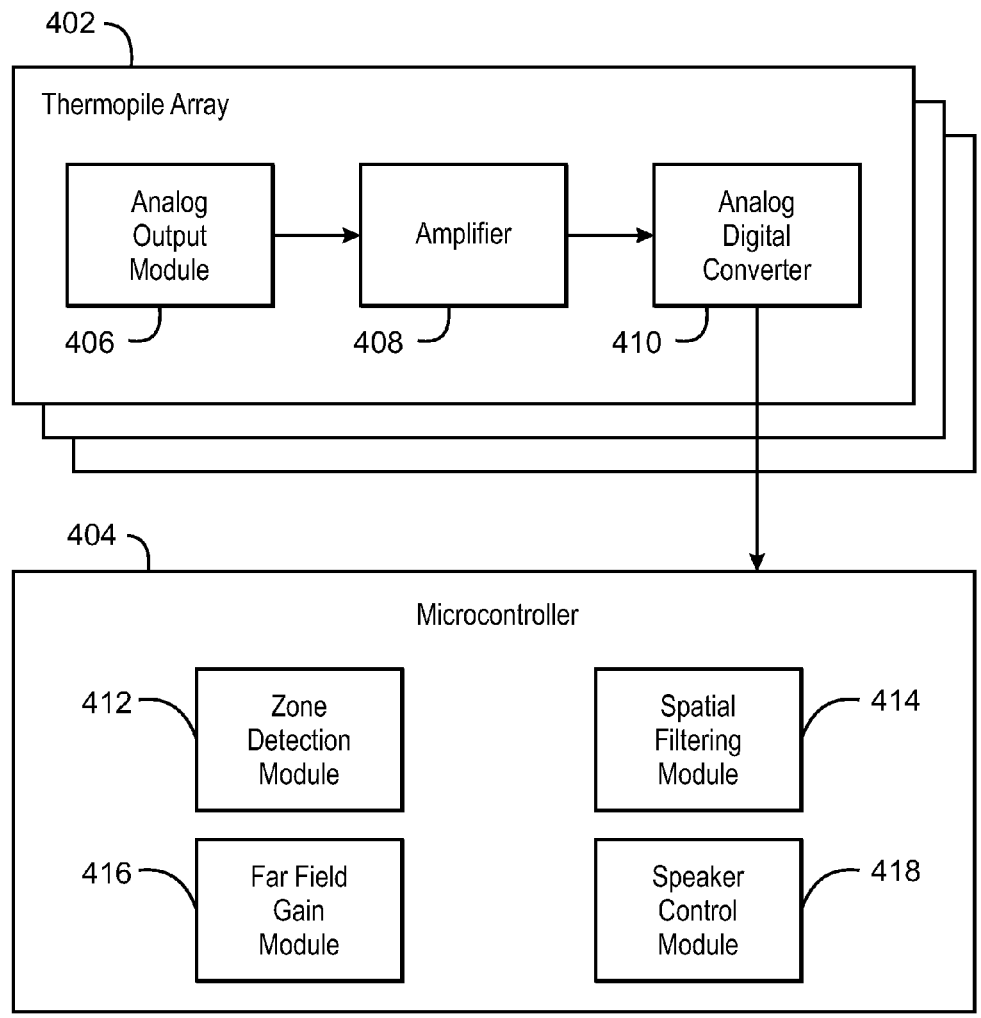
FIG. 4 is a block diagram of an example system that can adjust settings based on sensor data.

FIG. 4 is a block diagram of an example system that can adjust settings based on sensor data. The system 400 can include a thermopile array 402, and a microcontroller 404.

In some embodiments, the thermopile array 402 can include an analog output 406, an amplifier 408, and an analog-digital converter 410. The analog output 406 can detect an analog signal that corresponds to a detected temperature or temperature variation within a zone proximate a computing device. As discussed above, a zone detection module 122 of FIG. 1 may divide a field of view proximate a computing device into any suitable number of zones. In some embodiments, the zone detection module 122 of FIG. 1 can detect a difference in temperature within each zone. Detecting a difference in the temperature of a zone can indicate if a user is present. For example, a zone with a user may have a higher temperature than zones without a user. In some embodiments, the analog signal representing the temperature of a zone can be transmitted to the amplifier 408. The amplifier 408 can increase the frequency or wavelength of the analog signal using any suitable amplifying technique or algorithm. The amplifier 408 can send the amplified analog signal of the temperature of a zone to the analog-digital converter 410. The analog-digital converter 410 can convert the analog signal to a digital signal and send the digital signal containing the amplified temperature of a zone to a microcontroller 404.

In some embodiments, the microcontroller 404 can include a zone detection module 412, a spatial filtering module 414, a far field gain module 416, and a speaker control module 418. In some examples, the spatial filtering module 414, the far field gain module 416, and the speaker control module 418 can be included in a separate audio codec that receives data from the zone detection module 412. In some embodiments, the zone detection module 412 can detect the temperature differences between any suitable number of zones. For example, the zone detection module 412 may receive a digital signal indicating the temperature of each zone. In some examples, each zone may have one or more thermopile modules 402 that provide a digital signal representing the temperature of a zone. The zone detection module 412 can detect areas within the zones that correspond to higher temperatures that can indicate the presence of a user. In some embodiments, the zone detecting module 412 can designate a zone with a higher temperature as a dominant zone that likely includes a user.

In some embodiments, the spatial filtering module 414 can apply noise cancellation and modify the gain in the dominant zone. For example, the spatial filtering module 414 can increase the gain in the dominant zone to increase the accuracy of audio recording. Similarly, applying noise cancellation can also enable the spatial filtering module 414 to increase the accuracy of audio captured as input from a user. In some examples, the spatial filter module 414 can apply noise cancellation and modify the gain in a dominant zone until the spatial filter module 414 detects a change in the temperatures in the zones.

In some embodiments, the far field gain module 416 can detect depth information from the temperature differences in the dominant zone. For example, the far field gain module 416 may detect the depth of a user in the dominant zone based on a difference in temperature and adjust the far field gain to improve the recording quality as well as enhancing the audio quality in a video conferencing session. In some embodiments, the speaker control module 418 can adjust the amplitude and other parameters of audio output by adjusting the directionality of a speaker and the amplifier parameters corresponding to the speaker. For example, the speaker control module 418 may detect that a user is located in front of a speaker and the speaker control module 418 may increase the output of the speaker or adjust settings for multiple speakers to enhance the audio output that is directed to the dominant zone. In some examples, the speaker control module 418 can improve the audio listening experience by using sensor data from the thermopile array 402 to locate a user proximate a computing device and modify the settings to enhance the user's experience.

In some examples, the zone detection module 412 can also detect a user presence and use the user presence to transition a computing device from an inactive state, such as a standby state or hibernation state, to an active state. For example, the zone detection module 412 can continuously monitor the zones proximate a computing device and when the zone detection module 412 detects a temperature variation that corresponds to a user, the zone detection module 412 can ensure that the computing device transitions from an inactive state to an active state. In some embodiments, transitioning from an inactive state to an active state includes increasing the power consumption of a computing device by enabling an increased number of hardware components to receive power and operate with full functionality.

It is to be understood that the system of FIG. 4 is for illustrative purposes only. The components of FIG. 4 may include any suitable number of additional modules or may include fewer modules depending on the particular application.

Figure 5:
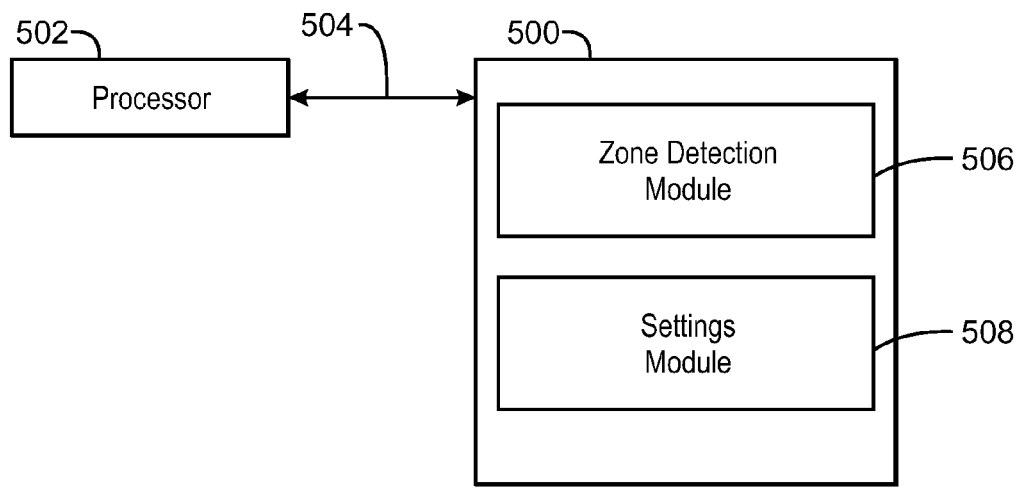
FIG. 5 is a block diagram depicting an example of a tangible, non-transitory computer-readable medium that can adjust settings based on sensor data.

FIG. 5 is a block diagram of an example of a tangible, non-transitory computer-readable medium that can adjust settings based on sensor data. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a zone detection module 506 may be adapted to direct the processor 502 to divide an area proximate a computing device into zones and detect sensor data from each zone. In some examples, the sensor data may include the temperature or temperature variations from each zone. In some embodiments, a settings module 508 may be adapted to direct the processor 502 to detect sensor data from any suitable number of zones and modify settings based on the detected sensor data. For example, the settings module 508 may modify the gain for each zone, the far field gain for a zone, and the level of output of a speaker for a zone, among others.

It is to be understood that any suitable number of the software components shown in FIG. 5 may be included within the tangible, non-transitory computer-readable medium 500. Furthermore, any number of additional software components not shown in FIG. 5 may be included within the tangible, non-transitory, computer-readable medium 500, depending on the specific application.

EXAMPLE 1

A method that can adjust a setting is described herein. In some examples, the method includes detecting sensor data from a sensor and ranking the sensor data based on predetermined zones. The method also includes identifying a dominant zone from the predetermined zones, and adjusting the setting based on the dominant zone.

In some embodiments, the method includes detecting sensor data from a thermopile sensor. Additionally, in some examples, the sensor data corresponds to a temperature variation in the predetermined zones. In some embodiments, the setting modifies spatial filtering that increases a gain setting for the dominant zone.

EXAMPLE 2

An electronic device for adjusting settings is described herein. In some examples, the electronic device includes logic to detect sensor data from a sensor and rank the sensor data based on predetermined zones. The logic can also identify a dominant zone from the predetermined zones that corresponds to a location of a user, and adjust the setting based on a dominant zone. In some embodiments, the setting modifies a far field gain that amplifies audio captured from a distance within the dominant zone that corresponds to a location of a user. The setting can also modify an audio output level for a speaker.

EXAMPLE 3

At least one non-transitory machine readable medium that can adjust a setting is described herein. The at least one non-transitory machine readable medium can have instructions stored therein that, in response to being executed on an electronic device, cause the electronic device to detect sensor data from a sensor and rank the sensor data based on predetermined zones. The at least one non-transitory machine readable medium can also have instructions stored therein that, in response to being executed on an electronic device, cause the electronic device to identify a dominant zone from the predetermined zones that corresponds to a location of a user, and adjust the setting based on a dominant zone.

In some embodiments, the instructions can cause the electronic device to detect that the user resides in more than one of the predetermined zones, and determine the dominant zone based on predetermined configurable weights. In some examples, the setting modifies a far field gain that amplifies audio captured from a distance within the dominant zone that corresponds to a location of a user.

Although an example embodiment of the disclosed subject matter is described with reference to block and flow diagrams in FIGS. 1-5, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted.

Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A method for adjusting a setting comprising:
   detecting sensor data from a plurality of sensors;
   ranking the sensor data based on predetermined zones;
   identifying a dominant zone from the predetermined zones based on predetermined configurable weights corresponding to a user that resides in at least two of the predetermined zones, wherein the predetermined configurable weights indicate a preference to assign a center zone of a field of view as the dominant zone, and wherein each of the predetermined zones corresponds to a portion of the field of view monitored by one of the plurality of sensors; and adjusting the setting based on the dominant zone, wherein the setting modifies a gain in the dominant zone by applying noise cancellation until a change in a temperature of the predetermined zones is detected, and wherein the sensor data corresponds to a temperature variation in the predetermined zones.

2. The method of claim 1, wherein one of the plurality of sensors is a thermopile sensor.

3. The method of claim 1, wherein the setting modifies spatial filtering that increases a gain setting for the dominant zone.

4. The method of claim 1, wherein the setting modifies an audio output level for a speaker.

5. The method of claim 1, wherein the dominant zone corresponds to a location of the user.

6. An electronic device for adjusting settings comprising: logic to:
    detect sensor data from a plurality of sensors;
    rank the sensor data based on predetermined zones;
    identify a dominant zone from the predetermined zones that corresponds to a location of a user based on predetermined configurable weights corresponding to the user that resides in at least two of the predetermined zones, wherein the predetermined configurable weights indicate a preference to assign a center zone of a field of view as the dominant zone, and wherein each of the predetermined zones corresponds to a portion of the field of view monitored by one of the plurality of sensors; and
    adjust the setting based on a dominant zone, wherein the setting modifies a gain in the dominant zone by applying noise cancellation until a change in a temperature of the predetermined zones is detected, and wherein the sensor data corresponds to a temperature variation in the predetermined zones.

7. The electronic device of claim 6, wherein one of the plurality of sensors is a thermopile sensor.

8. The electronic device of claim 6, wherein the setting modifies spatial filtering that increases a gain setting for the dominant zone.

9. The electronic device of claim 6, wherein the setting modifies an audio output level for a speaker.

10. At least one non-transitory machine readable medium having instructions stored therein that, in response to being executed on an electronic device, cause the electronic device to:
    detect sensor data from a plurality of sensors;
    rank the sensor data based on predetermined zones;
    identify a dominant zone from the predetermined zones that corresponds to a location of a user based on predetermined configurable weights corresponding to the user that resides in at least two of the predetermined zones, wherein the predetermined configurable weights indicate a preference to assign a center zone of a field of view as the dominant zone, and wherein each of the predetermined zones corresponds to a portion of the field of view monitored by one of the plurality of sensors; and
    adjust the setting based on a dominant zone, wherein the setting modifies a gain in the dominant zone by applying noise cancellation until a change in a temperature of the predetermined zones is detected, and wherein the sensor data corresponds to a temperature variation in the predetermined zones.

11. The at least one non-transitory machine readable medium of claim 10, wherein one of the plurality of sensors is a thermopile sensor.

12. The at least one non-transitory machine readable medium of claim 10, wherein the setting modifies spatial filtering that increases a gain setting for the dominant zone.

13. The at least one non-transitory machine readable medium of claim 10, wherein the setting modifies an audio output level for a speaker.

14. The electronic device of claim 6 comprising a thermopile array and a Fresnel lens, wherein the Fresnel lens is to focus temperature readings from the predetermined zones to enable the thermopile array to detect a temperature variation in the dominant zone.

15. The electronic device of claim 6, wherein the setting further modifies amplifier parameters of a speaker.

16. The electronic device of claim 15, wherein the setting further modifies a far field gain that amplifies audio captured from a distance within the dominant zone that corresponds to the location of the user.

* * * * *